(12) United States Patent
Reda et al.

(10) Patent No.: US 7,782,861 B2
(45) Date of Patent: Aug. 24, 2010

(54) CONFIGURATION AND ALIGNMENT TOOL FOR COMPUTER NETWORK RADIO EQUIPMENT

(75) Inventors: Michael Reda, Webster, NY (US); Ian MacLeod, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 141 days.

(21) Appl. No.: 12/169,425

(22) Filed: Jul. 8, 2008

(65) Prior Publication Data

US 2010/0008266 A1    Jan. 14, 2010

(51) Int. Cl.
*H04L 12/28*    (2006.01)

(52) U.S. Cl. .................. 370/392; 370/277; 370/310; 370/338; 455/557

(58) Field of Classification Search .................. 455/557
See application file for complete search history.

(56) References Cited

U.S. PATENT DOCUMENTS 6,202,039 B1* 3/2001 Finger ........................ 702/189
7,295,119 B2* 11/2007 Rappaport et al. ........ 340/572.4
7,610,016 B2* 10/2009 Schmitt et al. ............. 455/41.2
2007/0053332 A1* 3/2007 Kashiwagi et al. .......... 370/338
2009/0239574 A1* 9/2009 Hussain .................... 455/552.1

* cited by examiner

*Primary Examiner*—Duc C Ho
(74) *Attorney, Agent, or Firm*—Fox Rothschild, LLP; Robert J. Sacco

(57) ABSTRACT

A compact tool (100) for network radios implementing bi-directional data communication links in computer networks. The tool is formed of a compact chassis or body (101) that can be conveniently stored in a user's pocket. A control processor (502) contained within the chassis is coupled to a data network communications module (506), including an integrated connector (616). The control processor (502) and data network communications module is configured exclusively for communicating with the network radio. Such interface communications are performed using Simple Network Management Protocol (SNMP) and/or telnet protocols. Using these communication protocols, the tool (100) can access radio operating data stored or generated by the network radio. The operating data is displayed using a simple integrated display device (514, 614).

20 Claims, 6 Drawing Sheets

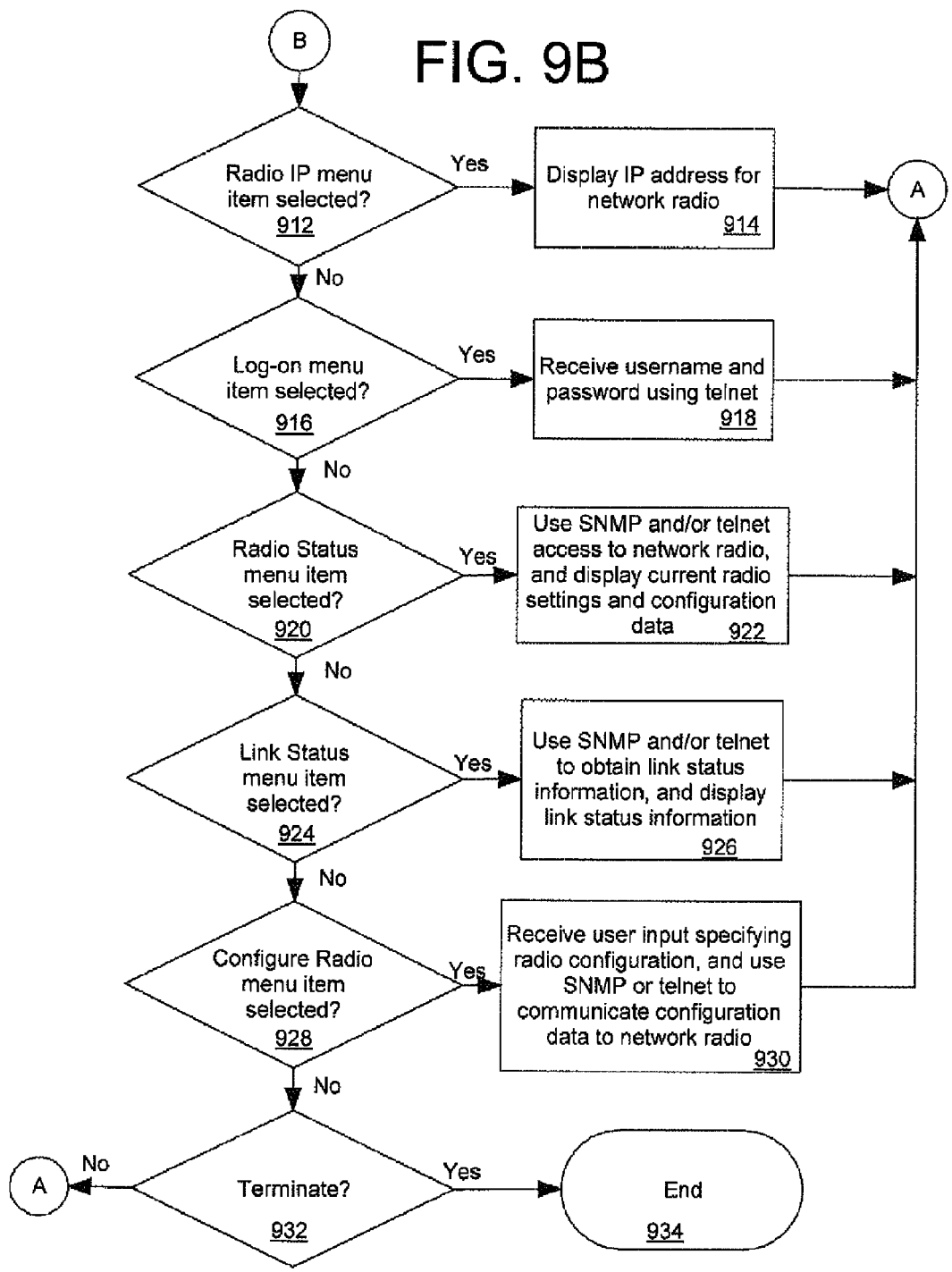

CONFIGURATION AND ALIGNMENT TOOL FOR COMPUTER NETWORK RADIO EQUIPMENT

BACKGROUND OF THE INVENTION

1. Statement of the Technical Field

The inventive arrangements concerns tools for configuring and aligning radio equipment, and more particularly tools used to configure Ethernet radio equipment.

2. Description of the Related Art

Military, homeland security and public safety personnel have a growing need for easily deployable lightweight high-speed broadband computer network radio equipment. Such equipment is useful for implementing wireless wide-area communications networks in point-to-point and point-to-multipoint configurations. Various IP based communication protocols, such as Ethernet, can be used for this purpose. For example, such network radio equipment can provide access to voice, messaging, imagery, video and other bandwidth-intensive information. Currently available equipment for this purpose can be used to transfer Internet Protocol (IP) traffic over many kilometers at data rates in excess of 70 Mbps. One example of such deployable high-speed Broadband Ethernet Radio is the model RF-7800W-OU440 which is commercially available from Harris Corporation of Melbourne, Fla. These easily deployable Broadband Ethernet Radio systems represent a less expensive alternative for IP based communications as compared to traditional microwave radio solutions.

Setting up a communications link using network radio equipment of the type described herein generally involves two steps: (1) entering certain network configuration settings, and (2) alignment of the antenna so that it is properly positioned for optimal radio communications. The configuration settings can include, without limitation, selecting a name for the radio system, selecting an access point IP address, entering an IP subnet mask to identify the sub-network, selecting a radio service set identifier and so on. Such configurations may include conventional network settings, as well as proprietary settings associated with a particular network radio. Configuring the network radio equipment as described herein typically requires at least a laptop computer to select the configuration settings.

A laptop used for configuration will conventionally communicate with the radio equipment using TCP/IP through an network interface using a browser application. A user performing such configuration tasks generally needs to have certain permissions and skills in order to perform such configuration tasks. For example, the user may need administrative access to the laptop and knowledge regarding the current configuration of the laptop. Further, the user needs to have sufficient familiarity with selection of IP addresses, knowledge of sub-nets and so on. Such configuration tasks may be further complicated by a harsh and/or possibly hostile environment.

Antenna alignment is also typically performed using a laptop computer. In particular, the network radio equipment can provide a received signal strength indication (RSSI) to the laptop computer. This value can be periodically updated on the laptop display screen so that the operator can determine an optimal position and orientation for the antenna portion of the network radio equipment.

SUMMARY OF THE INVENTION

The invention concerns a compact tool for network radios implementing bi-directional data communication links in computer networks. In a first embodiment, the tool is configured exclusively for aiding in an antenna alignment procedure for the network radio. The tool is comprised of a compact chassis that can be conveniently stored in a user's pocket. A data network interface is integrated within the chassis. The data network interface includes a data network interface connector for providing a data connection between the tool and a mating connector of the network radio. The tool also includes a control processor.

The control processor is coupled to the data network interface and configured exclusively for communicating with the network radio. Such interface communications are performed using Simple Network Management Protocol (SNMP) and/or telnet protocols. In the first embodiment, the interface communications exclusively access from the network radio received signal strength indication (RSSI) data. RSSI data identifies a received signal strength of an RF signal used to provide the bi-directional data communication link.

The invention also includes a display device that can be used to present the RSSI data to the user. For example, the display device can be comprised of a series of light emitting diodes or a liquid crystal display, including suitable driver circuitry. The display device and associated driver circuitry is coupled to the control processor. The control processor is configured to control the display device so as to display changing RSSI data in real time. Consequently, an antenna alignment of the network radio can be performed by a user by observing when a peak RSSI level is obtained. The control processor is advantageously configured to automatically access the RSSI data responsive to insertion of the data network interface connector in the mating connector provided on the network radio.

In a second embodiment of the invention, has a similarly sized compact chassis and a data network interface as described above for connecting the tool to a network radio. Likewise, the second embodiment includes a control processor coupled to the data network interface and configured exclusively for communicating with the network radio using at least one of Simple Network Management Protocol (SNMP) and telnet to access operating data associated with the network radio.

A display device including associated driver circuitry is provided. The display device is coupled to the control processor. The display device in the second embodiment can be an LCD, LED or other type of display suitable for displaying alpha-numeric data, and bar graph data. Two or more input switches are provided on the compact chassis for selecting one or more menu items presented on the display device.

In the second embodiment, users can select from two or more predetermined menu items presented on the display device. The control processor is configured to be responsive to such selections. More particularly, the control processor will, in response to predetermined menu items, access from the network radio selected operating data concerning the network radio. Such selected operating data is displayed on the display device. The selected operating data includes two or more operating parameters. For example, such operating parameters can include a radio transmit/receive frequency, received signal strength indication information, encoded burst-rate information, channel bandwidth, operational status of the bi-directional data communication link, and a signal to noise ratio.

The control processor is also configured, in response to selection of at least one predetermined menu item, to modify selected operating data concerning the network radio. For example, the selected operating data can be an IP address, a radio transmit/receive frequency, an encoded burst-rate, and a channel bandwidth.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein.

The invention concerns a dedicated alignment and/or configuration tool for network radio equipment used to provide access to voice, messaging, imagery, video and other bandwidth-intensive information. Currently available equipment for this purpose can be used to transfer Internet Protocol (IP) traffic over many kilometers at data rates in excess of 70 Mbps. One example of such deployable high-speed Broadband Ethernet Radio is the model RF-7800W-OU440 which is commercially available from Harris Corporation of Melbourne, Fla.

The alignment and/or configuration tool is capable of (1) entering network configuration settings for a network radio used in a wireless computer network implementing a networking technology such as Ethernet, and (2) aiding in the alignment of the antenna associated with an network radio so that it is properly positioned for optimal radio communications. The configuration settings can include, without limitation, selecting a name for the radio system, selecting an access point IP address, entering an IP subnet mask to identify the sub-network, selecting a radio service set identifier and so on. Such configurations may include conventional settings used in networking technologies such as Ethernet, as well as proprietary settings associated with a particular Ethernet radio such as the RF-7800W-OU440 mentioned above. The configuration and/or alignment tool as described herein advantageously eliminates the need for a laptop computer to align the antenna and/or select the configuration settings.

Figure 1:
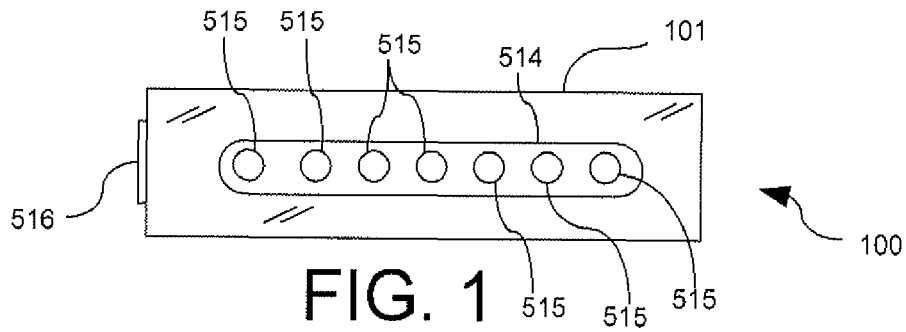
FIG. 1 is a top view of an alignment tool that is useful for aligning an antenna of a network radio which is used to implement a computer network.
Figure 2:
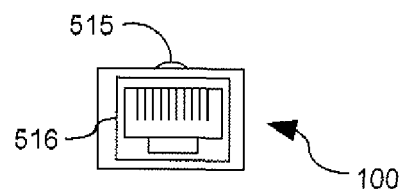
FIG. 2 is an end view of the alignment tool of FIG. 1.

Shown in FIG. 1 is a top view of an alignment tool 100. FIG. 2 is an end view of the alignment tool 100. The alignment tool 100 is of a compact arrangement such that it may fit easily within a user's hand or an ordinary pocket of a shirt or pant. According to one embodiment, the alignment tool can be approximately finger-sized, meaning that it is about the size of an adult human finger as shown. The alignment tool 100 includes a compact type of connector 516 suitable for communicating electronic data signals. For example, an RJ45 type connector can be used for this purpose. RJ45 connectors are commonly used to connect devices transmitting data over local area networks. For example, such connectors are commonly used with suitable data cables for connecting computers to routers and other network components. The connector 516 is selected to be either a male or female type connector. However, female type RJ45 connectors can advantageously be selected for the alignment tool 100 so as to allow a typical male-male data cable to be used for connecting the alignment tool 100 to the Broadband Ethernet Radio. As shown in FIG. 1, the connector 516 is preferably integrated to the chassis or body of the alignment tool 100 to improve the overall compact configuration of the device. Alternatively, the connector 516 could be mechanically and electrically connected to the body 101 of the configuration and alignment tool 300 by means of a short length of a suitable data cable (not shown).

Provided along an exterior panel of the alignment tool 100 is a light emitting diode (LED) display 514. The LED display is comprised of a series of LEDs 515 which illuminate for purposes which shall be better understood from the description below. According to one embodiment, the LEDs can be of various colors. For example, the two LEDs closest to the connector 516 can illuminate in a red color. The next two LEDs closest to connector 516 can be chosen to illuminate in a yellow color. The three LEDs furthest from the connector can be selected to illuminate in a green color. Alternative arrangements of the LED colors are, of course, possible.

Figure 3A:
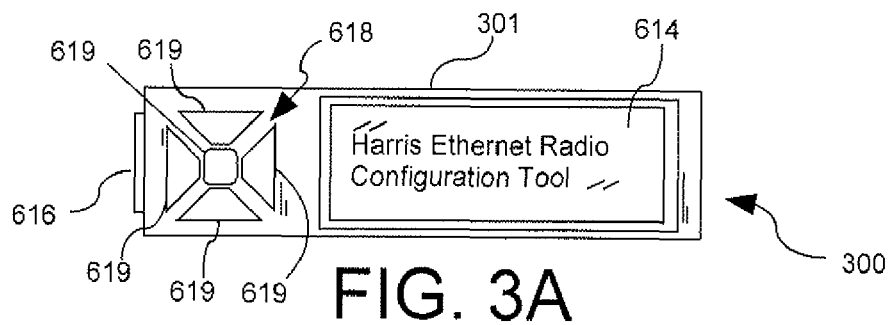
FIG. 3 is a top view a configuration and alignment tool that is useful for configuring a network radio and aligning an antenna of the network radio.
Figure 3B:
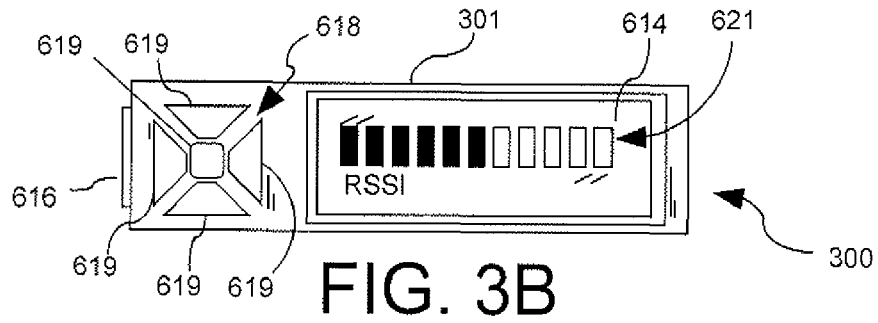
Figure 4:
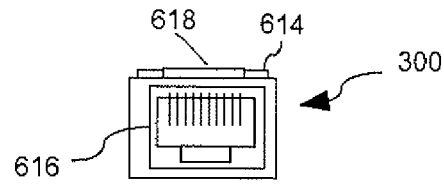
FIG. 4 is an end view of the configuration and alignment tool of FIG. 3

Referring now to FIGS. 3 and 4, there is shown an alternative embodiment of the inventive arrangements. FIGS. 3A and 3B are top views of an alignment and configuration tool 300 in a first and second operational mode, respectively. FIG. 4 is an end view of the configuration and alignment tool of FIG. 3. The alignment and configuration tool 300 has a physical configuration which is similar to the compact arrangement of alignment tool 100. In this regard, the chassis of the tool can be pocket-sized, meaning that it can easily fit within an ordinary sized shirt or pant pocket. According to one embodiment, the alignment tool can be roughly the size of an adult human finger as shown.

In this regard, tool 300 can includes a compact type of connector 616 suitable for communicating electronic data signals. For example, an RJ45 type connector can be used for this purpose. The connector 616 is advantageously selected to be a female type connector. However, a male type connector can also be used for this purpose. As shown in FIGS. 3 and 4, the connector 616 is preferably integrated to the main chassis or body of the alignment tool 300 to improve the overall compact configuration of the device. Alternatively, the connector 616 could be mechanically and electrically connected to the body 301 of the configuration and alignment tool 300 by means of a short length of a suitable data cable (not shown).

Provided along an exterior panel of the configuration and alignment tool 300 is a miniature display panel 614. The display panel 614 is preferably configured for displaying data that is useful for at least two operational modes. A first such mode is illustrated in FIG. 3A, in which approximately two lines of alpha-numeric data is displayed. A second such mode is illustrated in FIG. 3B, in which a bar graph 621 is provided. The miniature display panel 614 can be any suitable display type. For example, a liquid crystal display (LCD) type display can be used for this purpose. According to one embodiment, the liquid crystal display can be of the dot-matrix variety which is suitable for displaying text and simple graphics, such as bar graph 621.

Referring again to FIGS. 3 and 4, it can be observed that the configuration and alignment tool 300 advantageously includes a switch pad 618 which is comprised of one or more switches 619. In the embodiment shown, there are five (5) such switches 619 arranged in a cross pattern to aid in navigation. However, it should be understood that the invention is not limited to the precise number of switches or the arrangement shown. According to one embodiment, the switch pad can function as an input device which allows users to navigate menu lists, tables for selecting alpha-numeric symbols, and other functions which are provided by the configuration and alignment tool 300.

Figure 5:
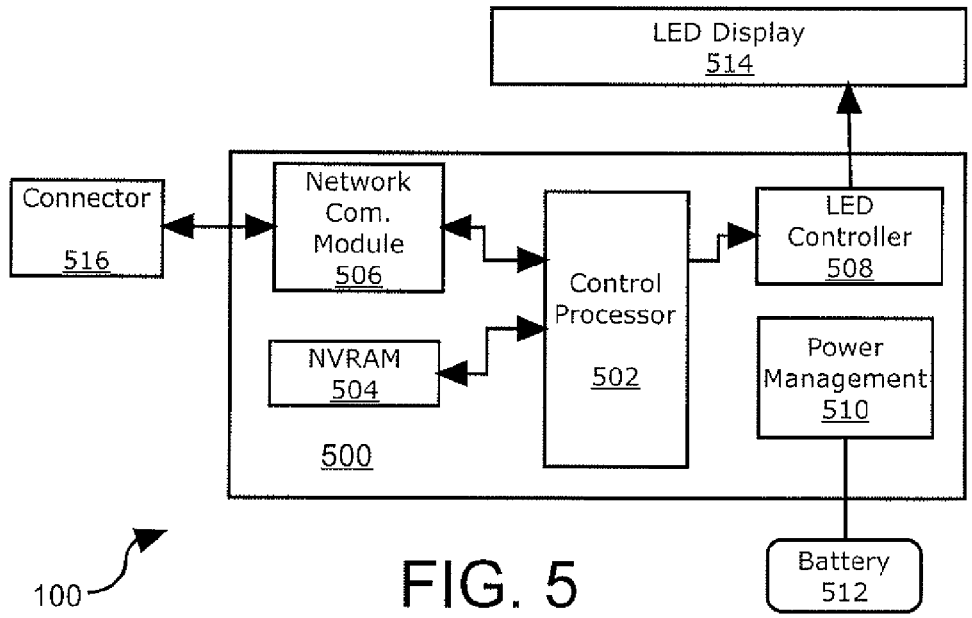
FIG. 5 is a block diagram that is useful for understanding the alignment tool of FIG. 1.

FIG. 5 is a block diagram of alignment tool 100 that is useful for understanding the important functional features of that device. Alignment tool 100 includes a control processor 502, non-volatile random access memory (NVRAM) 504, a network communications module 506 and an LED controller 508. According to one embodiment, all of these components can be mounted on a circuit board 500 contained within body 101. The block diagram of FIG. 5 also shows the alignment tool 100 can also include a connector 516 and LED display 514. A power management module 510 can be provided for managing power provided by an internal battery 512. Alternatively, power for alignment tool 100 can be provided via a separate power connector (not shown).

The control processor 502 can be comprised of any suitable hardware and software for carrying out the alignment functions herein described. In this regard, it should be understood that the control processor 502 can include any suitable electronic control unit. For example, the control processor 502 can be a microprocessor programmed with a set of instructions, a programmable microcontroller, or an application specific integrated circuit (ASIC). Programming data and other information needed by control processor 502 for carrying out the processes described herein can be stored in NVRAM 504.

LED controller 508 provides necessary drive voltages for illuminating the LEDs 515 comprising LED display 514. The LED controller can also be configured to selectively illuminate certain LEDs in LED display 514 in response to a control signal from control processor 502. LED controllers are well known in the art and therefore will not be described here in detail.

Power management unit 510 performs one or more functions which can include monitoring the power connection to the battery 512, monitoring charge level of battery 512, controlling power to other integrated circuits on circuit board 500, automatically shutting down the alignment tool 100 when it is left idle, and controlling power functions (on and off). Power management circuits are well known in the art and therefore will not be described in detail.

Network communications module 506 is configured to allow the alignment tool 100 to communicate directly with a radio used to implement a wireless computer network using a network technology such as Ethernet. For example, the network communications module can include an implementation of OSI layer 1 (physical layer) and layer 2 (data link layer) device, as can provides physical access to a networking medium and provides a low-level addressing system through the use of MAC addresses. The network communication module 506 advantageously provides the necessary functionality to allow the alignment tool 100 to connect to a network radio device. For example, the alignment tool 100 can connect to a network radio device using Ethernet based technology. Ethernet based systems are defined by a number of wiring and signaling standards which are applicable for the physical layer, through means of network access at the Media Access Control (MAC)/Data Link Layer, and a common addressing format. Ethernet is standardized as IEEE 802.3. Network communication modules as described herein are well known in the art.

Figure 6:
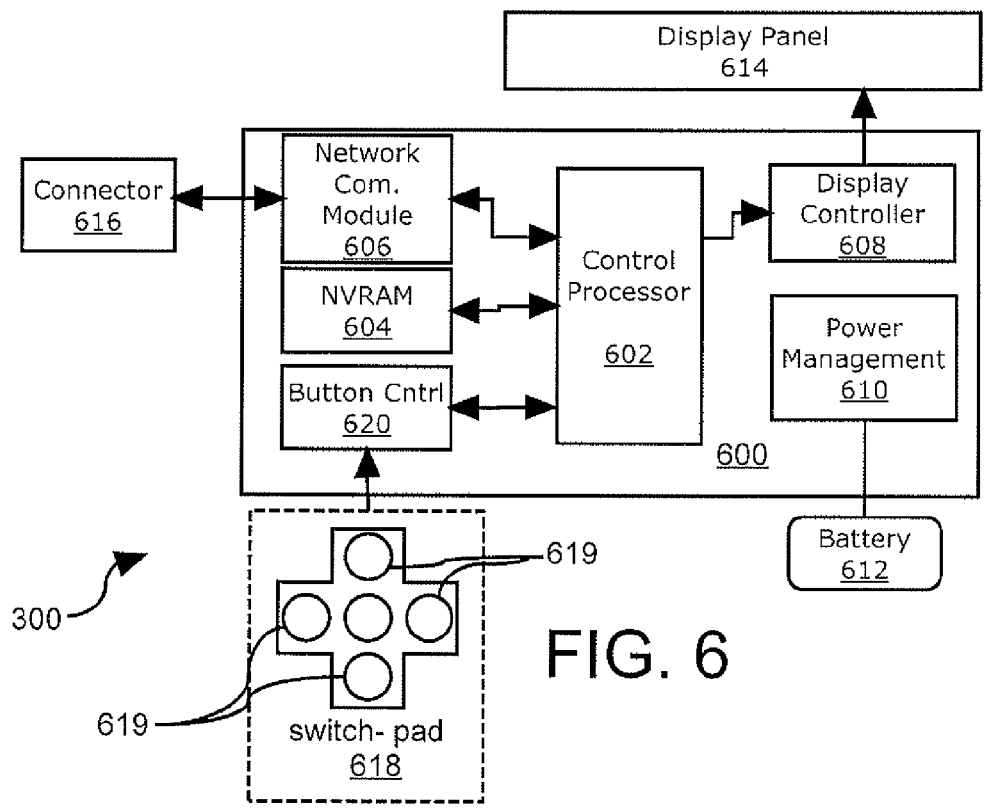
FIG. 6 is a block diagram that is useful for understanding the configuration and alignment tool of FIG. 3.

FIG. 6 is a block diagram that is useful for understanding the configuration and alignment tool 300. Several of the functional blocks in configuration and alignment tool 300 are similar in function and purpose to the corresponding units described above in relation to alignment tool 100. For example, these functional blocks include control processor 602, NVRAM 604, network communication module 606, and power management unit 610, circuit board 600 and battery 612. Accordingly, the description above is sufficient for purposes of understanding such functional blocks. As with alignment tool 100, power for configuration and alignment tool 300 can alternatively be provided via connector 616.

FIG. 6 also includes display controller 608 received digital data from control processor 602 and converts it into the proper format so the data can be displayed properly on the miniature display panel 614. For example, if the miniature display panel 614 is an LCD dot matrix type display, then the display controller 608 converts the digital data from control processor 602 into a suitable format to properly present alpha-numeric and/or bar graph data on the LCD dot matrix display.

A button controller 620 is provided for monitoring a position of switches 619 that comprise the switch pad 618. The button controller 620 communicates this information to the control processor 602 which responds with appropriate action in accordance with its programmed instructions.

Figure 7:
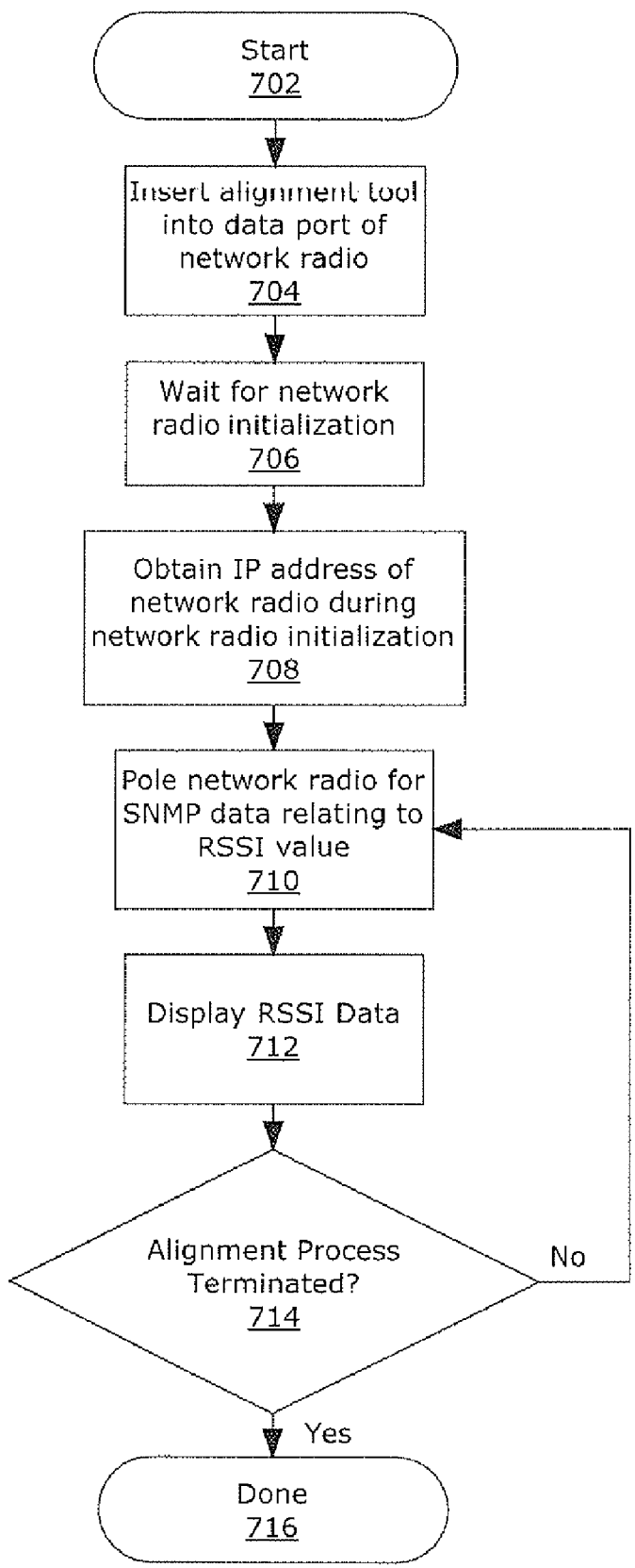
FIG. 7 is a flow chart that is useful for understanding the operation of the configuration and alignment tool in FIG. 3.
Figure 8:
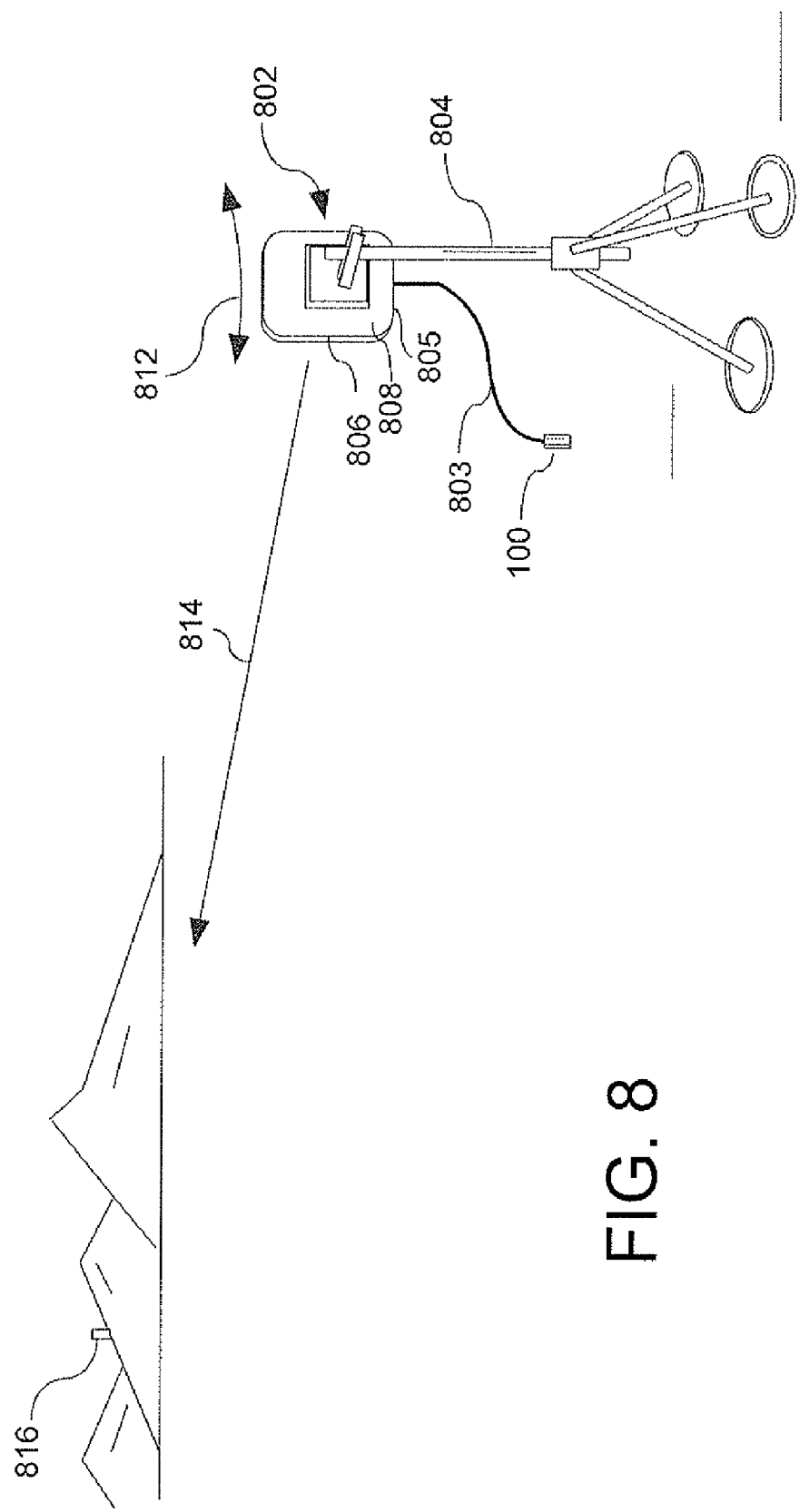
FIG. 8 is a drawing showing how an antenna of a network radio can be aligned in the field.

Referring now to FIGS. 7 and 8, the operation of the alignment tool 100 will be described in further detail. A network radio device 802 is positioned in the field at a remote location to provide high speed computer network communications over a wireless link. For example, devices of this type include the model RF-7800W-OU440 Broadband Ethernet Radio, which is commercially available from Harris Corporation of Melbourne, Fla. The network radio device 802 can be mounted on a portable tripod 804 or other suitable mounting support. The network radio device 802 includes an integrated directional antenna 806 for transmitting and receiving wireless network communications to a remote network node 816. The network radio device also includes a data port which is compatible with a data connector 805. The data port 805 is advantageously selected to be compatible with an RJ45 type connector and associated Ethernet data cable so that the alignment tool 100 can communicate through data port 805 to data port 516 of alignment tool 100.

In order to establish effective communications, it is generally desirable to align or aim the directional antenna 806 so that its maximum gain will be in a direction 814 corresponding to the location of remote network node 816. Referring to FIG. 7, the alignment process begins in step 702 and continues to step 704. In step 704, an Ethernet data cable is used to connect the alignment tool 100 to data port 805 of the network radio 802. It will be appreciated that connector 516 of tool 100 can be coupled to data port 805 by means of any suitable Ethernet data cable 803. In an alternative embodiment, not show, connector 516 of alignment tool 100 can be mated directly to the data port 805 of the network radio 802. In step 706, the tool 100 waits for initialization of the network radio 802. Such initialization can be performed by the user applying power to the network radio.

During initialization, the network radio 802 will initiate a conventional address resolution protocol (ARP). As will be appreciated by those skilled in the art, ARP refers to a well known process in which a particular network device (the network radio 802 in this case) broadcasts a request message to other devices on the network asking that they identify their IP addresses. The request message includes the IP address of the network device that originates the request. Thus, other connected devices (in this case the alignment tool) can determine the address of the network radio based on the ARP request message. This ARP process is performed in step 708 to permit the alignment tool 100 to obtain the IP address of the network radio. Of course, any other suitable method can also be used to obtain the IP address of the network radio.

Once the IP address of the network radio device is known, the alignment tool 100 can communicate with the network radio 802 in step 702 by using any suitable signaling protocol known in the art. For example, and without limitation, simple network management protocol (SNMP) can be used for this purpose. SNMP is a conventional protocol that consists of a set of well known standards for network management. The standards define an Application Layer protocol, a database schema, and a set of data objects. As will be appreciated by those skilled in the art SNMP advantageously exposes management data in the form of variables on the managed systems, which describe the system configuration. These variables can then be queried by the tool 100. For purposes of the alignment procedure, this means that selected data such as received signal strength information (RSSI) can be queried or polled by the tool 100 in step 710. Once obtained, the RSSI data can be conveniently displayed by tool 100 in step 712. For example, the RSSI data can be displayed by using LED display 514 to form a bar graph. This process is repeated until the alignment too detects that the process is terminated in step 714. For example, such termination can occur when the alignment tool is removed from the data port of the network radio. If the alignment tool detects such removal, the process ends in step 716.

Notably, the RSSI data displayed by the alignment tool 100 can be used by an equipment operator to align directional antenna 806. In particular, the network radio device 802 or tripod 804 can be pivoted so that boresight (the angle of maximum gain) of antenna 806 is pointed precisely toward the remote network node 816. This is accomplished by an operator observing the LED display 514 of tool 100 while pivoting network radio device about an arc 812. The network radio device orientation is adjusted in this way until the maximum RSSI value is observed. Notably, the foregoing alignment procedure is performed without the need for a laptop computer.

Figure 9A:
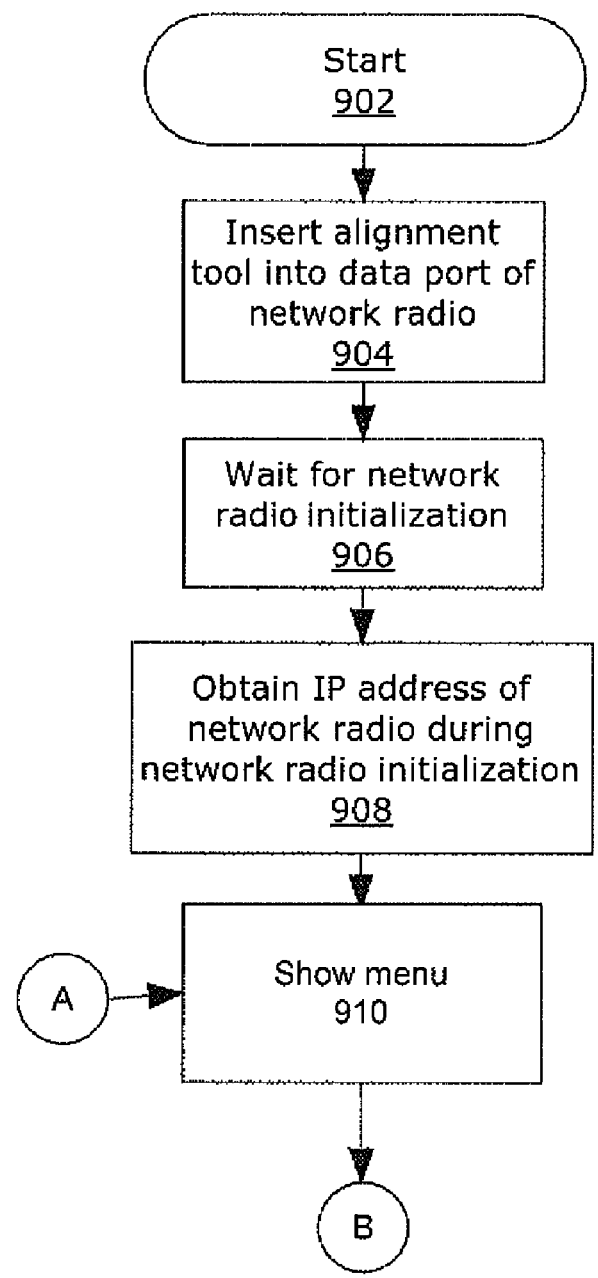
FIG. 9 is a flow chart that is useful for understanding the operation of the configuration and alignment tool in FIG. 3.

Referring now to FIG. 9, there is illustrated a flow chart which is useful for understanding the operation of the configuration and alignment tool 300. In FIG. 9, steps 902-908 are similar to steps 702-708 described above. However, in step 910 the tool 300 can show a menu to offer a user one or more options associated with alignment and configuration of the network radio 802. These menu items include the following: (1) Radio IP, (2) Log-on Information (3) Radio Status, (4) Link Status, and (5) Configure Radio. The various menu items can be accessed by scrolling through various screens shown on display 614 and using switches 619.

In step 912, if the Radio IP menu item is selected, the tool 300 will display information relating to the IP address of the network radio. Specifically, the tool 300 will display the IP address of the network radio in step 914.

Alternatively, in step 916, if the Log-on menu item is selected, the tool 300 will prompt a user to enter a user-name and password in step 618. The username and password can be entered using switches 619 to select alpha-numeric characters displayed on-screen. Entry of a user name and password can be used as a requirement prior to accessing selected other menu options. For example, a user name and password can be required in order to proceed with step 928 described below.

In step 920, if the Radio Status menu item is selected, the tool 300 can display in step 922 information relating to current radio settings and configuration data. For example, such configuration data can include a radio transmit/receive frequency, encoded burst-rate information, channel bandwidth, and RSSI data. Selection of the various information types for display can be accomplished by means of switches 619.

In step 924, if the Link Status menu item is selected, the tool 300 can display in step 926 information relating to the radio link that has been established with at least one other network node. For example, such link status information can include an indication as to whether the link is operational, the signal to noise ratio, RSSI, and so on.

Finally, in step 928, if the user selects the Configure Radio menu item, the user can use the tool 300 to control various network radio settings. For example, such settings which can be controlled may include selection of the IP address of the radio. According to another embodiment, the interface port of the tool 300 can be used for configuring the tool itself.

The various actions described in steps 912-932 can be performed by using SNMP and/or telnet techniques to access information contained in the network radio 802.

SNMP advantageously exposes management data in the form of variables on the managed systems, which describe the system configuration. These variables can then be queried by the tool 100. The variables can also be set by the tool 300. Conventional SNMP agents expose management data on the network radio. The tool 300 can retrieve the information through the conventional SNMP protocol operations such as GET, GETNEXT and GETBULK. Alternatively, the agent executing on the network radio will send data without being asked using TRAP or INFORM protocol operations. Telnet is equally well known in the art and therefore shall not be described here in detail.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A compact tool for aiding in the alignment of an antenna of a network radio used to implement a bi-directional data communication link in a computer network, said tool comprising:

a compact pocket-sized chassis;

a data network interface comprising a data interface connector integrated into said chassis and configured to mate with a connector of said network radio so that said tool can be directly connected to said network radio;

a control processor coupled to said data network interface and configured exclusively for communicating with said network radio using at least one of Simple Network Management Protocol (SNMP) and a telnet protocol to access operating data that is associated with said network radio; and a display means coupled to said control processor and configured for displaying said operating data;

wherein said operating data is a received signal strength indication (RSSI) data identifying a received signal strength of an RF signal used to provide said bi-directional data communication link, and said RSSI data is displayed by said display means when said tool is connected to said network radio.

2. The tool according to claim 1, wherein said display means is comprised of a set of indicator segments selected from the group consisting of a plurality of light emitting diodes and a plurality of LCD segments.

3. The tool according to claim 2, wherein said indicator segments define a bar graph.

4. The tool according to claim 1, wherein said network radio is an Ethernet radio device.

5. The tool according to claim 1, wherein said control processor is further configured to access an internet protocol (IP) address of said network radio using at least one of said SNMP and said telnet protocol.

6. The tool according to claim 5, further comprising a plurality of input switches for selecting one or more menu items presented on said display means.

7. The tool according to claim 6, wherein said control processor is configured, in response to selection of at least one predetermined menu item, to access from said network radio and display on said display means selected operating data concerning said network radio.

8. The tool according to claim 7, wherein said selected operating data is selected from the group comprising a radio transmit/receive frequency, received signal strength indication information, encoded burst-rate information, channel bandwidth, operational status of the bi-directional data communication link, and a signal to noise ratio.

9. The tool according to claim 7, wherein said control processor is configured, in response to selection of at least one predetermined menu item, to modify selected operating data concerning said network radio.

10. A compact tool for a network radio used to implement a bi-directional data communication link in a computer network, comprising:
  a compact pocket-sized chassis;
  a data network interface configured for connecting said tool to said network radio, said data network interface comprising a data network interface connector;
  a control processor coupled to said data network interface and configured exclusively for communicating with said network radio using at least one of Simple Network Management Protocol (SNMP) and telnet to access operating data associated with said network radio; and
  a display means coupled to said control processor and configured for displaying said operating data;
  wherein said operating data is a received signal strength indication (RSSI) data identifying a received signal strength of an RF signal used to provide said bi-directional data communication link; and
  wherein, said control processor is further configured to automatically access said RSSI data subsequent to the insertion of said data network interface connector into a mating connector provided on said network radio.

11. A compact tool for a network radio used to implement a bi-directional data communication link in a computer network, comprising:
  a compact pocket-sized chassis;
  a data network interface for connecting said tool to said network radio;
  a control processor coupled to said data network interface and configured exclusively for communicating with said network radio using at least one of Simple Network Management Protocol (SNMP) and a telnet protocol to access operating data that is associated with said network radio; and
  a display means coupled to said control processor and configured for displaying said said operating data;
  wherein said operating data is a received signal strength indication (RSSI) data identifying a received signal strength of an RF signal used to provide said bi-directional data communication link and said RSSI data is displayed by said display means when said tool is connected to said network radio; and
  wherein said data network interface further comprises an electronic data interface in a data network interface connector integrated into said chassis which allows said tool to be directly connected to said network radio.

12. A compact tool for aiding in the alignment of an antenna of a network radio used to implement a bi-directional data communication link in a computer network, said tool comprising:
  a compact pocket-sized chassis;
  a data network interface comprising a data interface connector integrated into said chassis and configured to mate with a connector of said network radio so that said tool can be directly connected to said network radio;
  a control processor coupled to said data network interface and configured exclusively for communicating with said network radio using at least one of Simple Network Management Protocol (SNMP) and a telnet protocol to access operating data that is associated with said network radio;
  a display means coupled to said control processor and configured for displaying said operating data; and
  a plurality of input switches for selecting one or more menu items presented on said display means;
  wherein said operating data is a received signal strength indication (RSSI) data identifying a received signal strength of an RF signal used to provide said bi-directional data communication link and said RSSI data is displayed by said display means when said tool is connected to said network radio; and
  wherein said control processor is further configured to access an internet protocol (IP) address of said network radio using at least one of said SNMP and said telnet protocol, and is responsive to said input switches for displaying said IP address.

13. A compact tool for aiding in the alignment of an antenna of a network radio used to implement a bi-directional data communication link in a computer network, said tool comprising:
  a compact pocket-sized chassis;
  a data network interface comprising a data interface connector integrated into said chassis and configured to mate with a connector of said network radio so that said tool can be directly connected to said network radio;
  a control processor coupled to said data network interface and configured exclusively for communicating with said network radio using at least one of Simple Network Management Protocol (SNMP) and a telnet protocol to access operating data that is associated with said network radio;
  a display means coupled to said control processor and configured for displaying said operating data; and
  a plurality of input switches for selecting one or more menu items presented on said display means;

wherein said operating data is a received signal strength indication (RSSI) data identifying a received signal strength of an RF signal used to provide said bi-directional data communication link and said RSSI data is displayed by said display means when said tool is connected to said network radio; and wherein said control processor is further configured to access an internet protocol (IP) address of said network radio using at least one of said SNMP and said telnet protocol, and in response to said input switches, to prompt a user to enter at least one of a user name and password required for configuring said network radio.

14. A compact tool for aiding in the alignment of an antenna of a network radio used to implement a bi-directional data communication link in a computer network, said tool comprising:

a compact pocket-sized chassis;

a data network interface comprising a data interface connector integrated into said chassis and configured to mate with a connector of said network radio so that said tool can be directly connected to said network radio;

a control processor coupled to said data network interface and configured exclusively for communicating with said network radio using at least one of Simple Network Management Protocol (SNMP) and a telnet protocol to access operating data that is associated with said network radio;

a display means coupled to said control processor and configured for displaying said operating data; and a plurality of input switches for selecting one or more menu items presented on said display means;

wherein said operating data is a received signal strength indication (RSSI) data identifying a received signal strength of an RF signal used to provide said bi-directional data communication link and said RSSI data is displayed by said display means when said tool is connected to said network radio;

wherein said control processor is further configured to access an internet protocol (IP) address of said network radio using at least one of said SNMP and said telnet protocol, in response to selection of at least one predetermined menu item, to access from said network radio and display on said display means selected operating data concerning said network radio, and in response to selection of at least one predetermined menu item, to modify selected operating data concerning said network radio; and wherein said selected operating data comprises an IP address of said network radio.

15. A compact tool for aiding in the alignment of a antenna of a network radio used to implement a bi-directional data communication link in a computer network, said tool comprising:

a compact pocket-sized chassis;

a data network interface including a data network interface connector integrated into said pocket-sized chassis and configured to mate with a connector of said network radio so that said tool can be directly connected to said network radio;

a control processor coupled to said data network interface and configured exclusively for communicating with said network radio using at least one of Simple Network Management Protocol (SNMP) and a telnet protocol to exclusively access received signal strength indication (RSSI) data associated with said network radio identifying a received signal strength of an RF signal used to provide said bi-directional data communication link; and a display means coupled to said control processor and configured to display said changing RSSI data in real time when said tool is connected to said network radio so that said antenna alignment at a peak RSSI of said network radio can be performed.

16. A compact tool for a network radio used to implement a bi-directional data communication link in a computer network, comprising:

a compact pocket-sized chassis;

a data network interface for connecting said tool to said network radio;

a control processor coupled to said data network interface and configured exclusively for communicating with said network radio using at least one of Simple Network Management Protocol (SNMP) and telnet to access operating data associated with said network radio;

a display means coupled to said control processor and configured for displaying said operating data; and a plurality of input switches for selecting one or more menu items presented on said display means;

wherein said operating data is a received signal strength indication (RSSI) data identifying a received signal strength of an RF signal used to provide said bi-directional data communication link; and wherein said control processor is further configured to access an internet protocol (IP) address of said network radio using at least one of said SNMP and said telnet processes, in response to selection of at least one predetermined menu item, to access from said network radio and display on said display means selected operating data concerning said network radio, in response to selection of at least one predetermined menu item, to modify selected operating data concerning said network radio, and to automatically access said RSSI data responsive to insertion of said data network interface connector in said mating connector provided on said network radio.

17. A compact tool for aiding in the alignment of an antenna of a network radio used to implement a bi-directional data communication link in a computer network, said tool comprising:

a compact pocket-sized chassis;

a data network interface comprising a data interface connector integrated into said chassis and configured to mate with a connector of said network radio so that said tool can be directly connected to said network radio;

a control processor coupled to said data network interface and configured exclusively for communicating with said network radio using at least one of Simple Network Management Protocol (SNMP) and a telnet protocol to access operating data associated with said network radio;

a display means coupled to said control processor; and a plurality of input switches for selecting one or more menu items presented on said display means;

wherein said control processor is configured, in response to selection of at least one predetermined menu item, to access from said network radio and to display on said display means selected operating data concerning said network radio, said operating data including received signal strength indication (RSSI) data identifying a received signal strength of an RF signal used to provide said bi-directional data communication link.

18. The tool according to claim 17, wherein said selected operating data is selected from the group comprising a radio transmit/receive frequency, received signal strength indication information, encoded burst-rate information, channel bandwidth, operational status of the bi-directional data communication link, and a signal to noise ratio.

19. The tool according to claim 17, wherein said control processor is configured, in response to selection of at least one predetermined menu item, to modify selected operating data concerning said network radio.

20. The tool according to claim 19, wherein said selected operating data comprises at least one of an IP address, a radio transmit/receive frequency, an encoded burst-rate, and a channel bandwidth.

* * * * *